No. 625,306.  
C. E. VAN AUKEN.  
HEATING APPARATUS AND DEVICE FOR CONTROLLING ACTION THEREOF.  
(Application filed Mar. 3, 1898.)  
Patented May 16, 1899.
(No Model.)  
2 Sheets—Sheet 1.
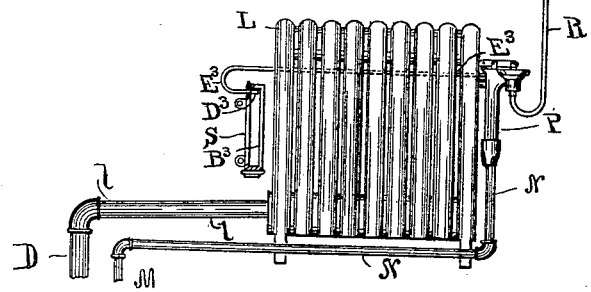
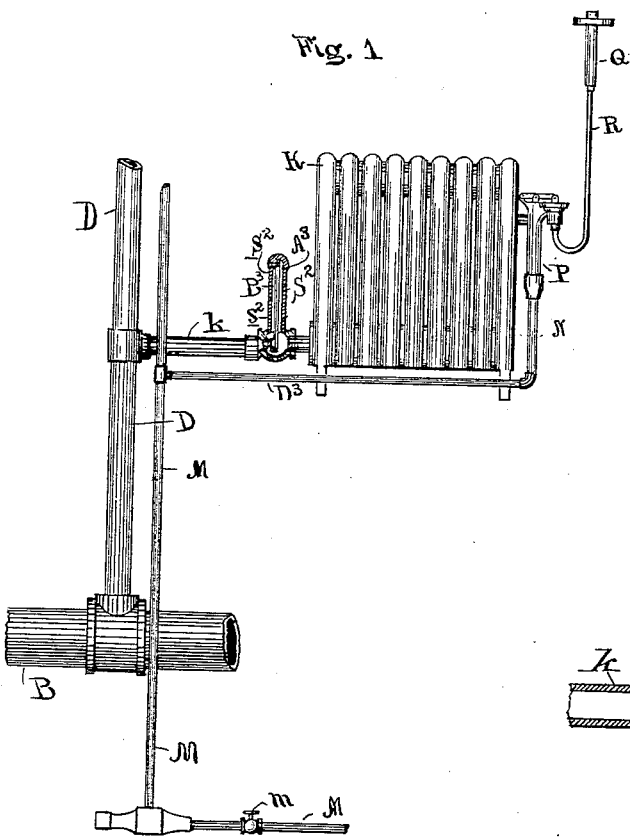
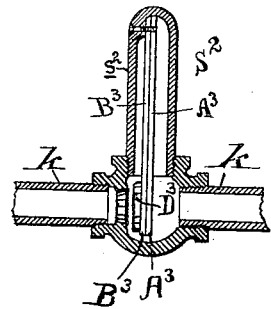

No. 625,306. Patented May 16, 1899.
C. E. VAN AUKEN.
HEATING APPARATUS AND DEVICE FOR CONTROLLING ACTION THEREOF.
(Application filed Mar. 3, 1898.)
(No Model.) 2 Sheets—Sheet 2.
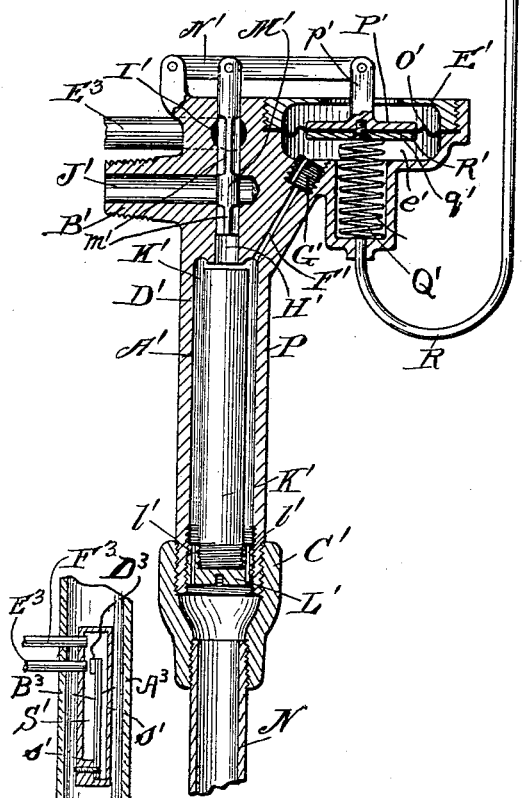
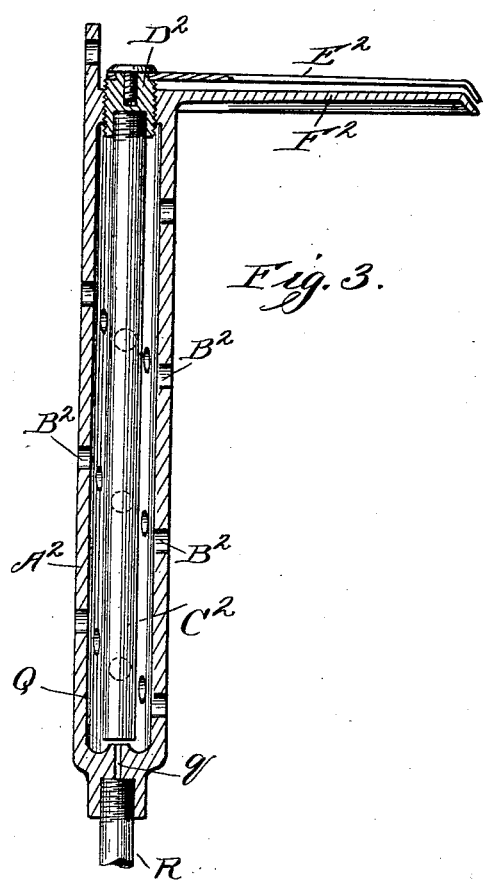
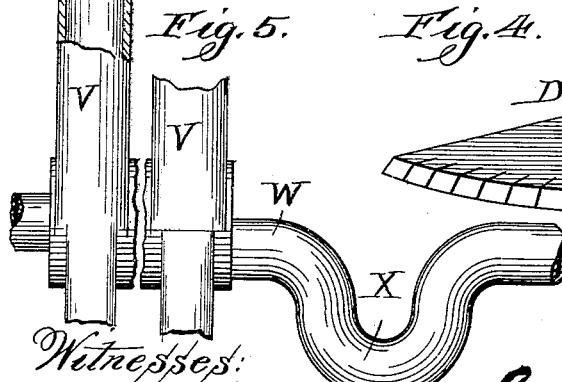
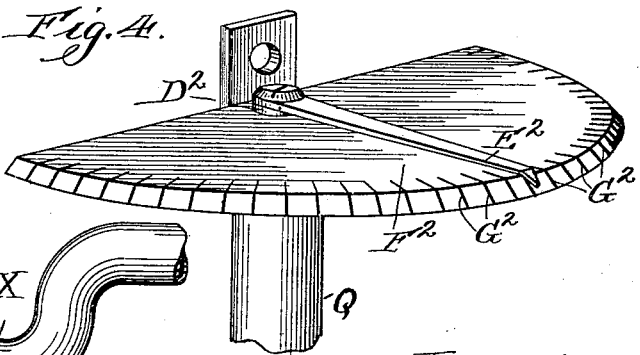
Witnesses:
W. J. Jacker
Flora L. Brown.
Inventor:
Clarence E. Van Auken
By Charles Turner Brown,
Atty.

UNITED STATES PATENT OFFICE.

CLARENCE E. VAN AUKEN, OF CHICAGO, ILLINOIS.

HEATING APPARATUS AND DEVICE FOR CONTROLLING ACTION THEREOF.

SPECIFICATION forming part of Letters Patent No. 625,306, dated May 16, 1899.

Application filed March 3, 1898. Serial No. 672,437. (No model.)

*To all whom it may concern:*

Be it known that I, CLARENCE E. VAN AUKEN, residing in Chicago, in the county of Cook and State of Illinois, have invented certain new and useful Improvements in Heating Apparatus and Devices for Controlling the Action Thereof, of which the following is a full, clear, and exact description when taken in connection with the drawings accompanying and forming a part hereof, and to the reference-letters marked thereon, and wherein a reference-letter applied to designate a given part is used to indicate such part throughout the several figures of the drawings wherever the same appears.

This invention relates to steam heating apparatus placed in an inclosure which is to be heated or warmed thereby, such steam heating apparatus forming a part of a steam-heating plant.

This invention has for its purpose the construction of a steam-heating plant wherein steam at a pressure less than the pressure of the atmosphere is to be used as a heating medium or agent and in which automatically-operating devices are provided for introducing such steam into steam-receptacles (steam-radiators or steam-coils) and as required to maintain a uniform, or nearly so, temperature in the inclosures in which the several steam-receptacles are located and by which such inclosures are heated, to increase or diminish the volume of the heating medium present in the receptacle by introducing thereinto a fluid-piston consisting of air at atmospheric pressure supplied, preferably, from the inclosure in which the receptacle is located, such fluid-piston constituting a mechanical agent ever present and in condition to be supplied thereto, and the devices used for controlling and determining the supply thereof thereto being so constructed and so controlled by thermostat devices that such fluid-piston is alternately placed in the receptacle and withdrawn therefrom, so as to maintain a determined and practically uniform temperature in the inclosure in which the receptacle is located and the temperature whereof is controlled thereby.

In the drawings referred to as forming a part of the specification, Figure 1 is an elevation of a radiator of a steam-heating plant embodying the invention. Fig. 2 is a vertical sectional view of the valve which is interposed between the steam-receptacle and the pressure-reducing pipe of such steam-receptacle. Fig. 3 is a vertical sectional view of a thermostat device actuated to a determined amount by variation of temperature of the inclosure in which the steam-receptacle is located and determining the operation of the valve illustrated in Fig. 2; and Fig. 4 is a perspective view of a construction of the upper end of the thermostat device illustrated in Fig. 3, whereby such thermostat device is made adjustable within a few degrees by the occupant of the inclosure or by the person in charge thereof, such adjustment controlling and determining the temperature of the inclosure by determining and controlling the movement of the valve illustrated in Fig. 2. Fig. 5 is an elevation of the end of a steam-receptacle, with the middle part thereof broken away, on an enlarged scale, with a part of one end of the steam-receptacle broken away to show a thermostat device contained therein and operated by the contents thereof to alternately open and close the passage-way from the inclosure in which the steam-receptacle is placed into the valve which is interposed between the steam-receptacle and the pressure-reducing pipe thereof. There is also shown in this figure a trap or seal employed in a two-pipe system, so that when the pressure in the steam-receptacle is reduced to less than atmospheric pressure air will not flow from the steam-receptacle through the trap into the water-of-condensation-discharge pipe, thereby insuring the flow of steam at less than atmospheric pressure from the steam-supply pipe into the steam-receptacle. Fig. 6 is an elevation of a steam-receptacle having a thermostat device attached thereto, near the steam-supply end thereof, which is a modification of the thermostat device shown in vertical section in Figs. 1 and 7; and Fig. 7 is a vertical sectional view, on an enlarged scale, of the thermostat device illustrated in Fig. 1.

B is a horizontal steam-supply pipe.

D is a steam-supply pipe constituting a riser communicating with steam-supply pipe B.

K L are steam-receptacles, (radiators or coils.)

$k$ is a steam-pipe interposed between riser

D and steam-receptacle K to deliver steam from such riser into such steam-receptacle.

*l* is a pipe interposed between riser D and the receptacle L to discharge steam from such riser into such receptacle.

M is a pipe one end whereof is in connection with (through interposed pipes N N, respectively) the respective steam-receptacles of the plant and the other end whereof is connected to a pressure-reducing apparatus.

*m* is a valve in pipe M.

P is a valve shown in Figs. 1 and 6 as interposed between the steam-receptacles, respectively, and the pipes N N, and shown in vertical section in Fig. 2 of the drawings.

Q is a thermostat device shown in Figs. 1 and 6 as connected to the steam-receptacles L and K, respectively, by pipes R R, and illustrated in vertical section in Fig. 3 of the drawings. The upper end of this thermostat device is also shown in perspective in Fig. 4 of the drawings.

S is a thermostat device shown in Fig. 6 as secured in place adjacent to steam-receptacle L at the supply end of such receptacle.

S' is a thermostat device (shown in vertical section in Fig. 5 of the drawings) contained within the steam-receptacle, (lettered V,) and *s'* is the casing of thermostat device.

$S^2$, Figs. 1 and 7, is a thermostat device (shown in vertical section by the breaking away of the casing $s^2$ thereof) interposed between steam-supply pipe D (in pipe *k*) and the steam-receptacle K.

W is a pipe having therein trap X. (Shown in Fig. 5 as attached to, to receive water of condensation from, steam-receptacle V.)

The supply of steam at less than atmospheric pressure being provided in riser D, the successful operation of the plant embodying the invention is largely dependent upon the operation of the several thermostat devices illustrated in Figs. 1, 3, 4, 5, and 6 of the drawings and the valve illustrated in Figs. 1 and 6, and on an enlarged scale, in Fig. 2, of the drawings.

Before proceeding to describe in detail the several devices illustrated in the drawings I will briefly describe the difference in operation of the apparatus in case the thermostat device illustrated in vertical section in Fig. 1 as interposed between the steam-supply pipe and the steam-receptacle there illustrated is used from the operation of the apparatus when the thermostat device illustrated as attached or set up adjacent to the steam-receptacle shown in Fig. 6 or the thermostat device shown in Fig. 5 as inserted in one of the coils of the steam-receptacle is used.

Taking first the thermostat device interposed between the steam-supply pipe and the steam-receptacle shown in Fig. 1 of the drawings, when the thermostat device controlling the operation of the valve interposed between such steam-receptacle and the pressure-reducing pipe thereof is actuated to cause (by means hereinafter described) the valve to operate to close the passage-way between the steam-receptacle and the pressure-reducing pipe and to open the passage-way from the inclosure in which the steam-receptacle is placed into the steam-receptacle, air will flow into the steam-receptacle, the pressure of the steam therein being less than its atmospheric pressure, until all of the steam contained therein has been either changed into water of condensation or a portion thereof so changed and the remainder driven back therefrom into the supply-pipes, (provided, of course, that the thermostat device controlling the valve does not change while the air is so flowing into the steam-receptacle.) When the steam-receptable is filled with air, such air will come in contact with the thermostat device interposed between the steam-receptacle and the supply-pipe thereof and the pressure of such air, in combination with the thermostatic actuation thereof, will cause such thermostat device to close the passage-way from the supply-pipe into the steam-receptacle, thus preventing the flow of air from the steam-receptacle into the steam-supply pipe thereof, the steam-receptacle being, however, filled with air at atmospheric pressure and the air passage-way from the inclosure in which the receptacle is placed through the valve and into the receptacle being open. When the thermostat device controlling the movement of the valve changes by reason of a change in the temperature of the inclosure in which such thermostat device is placed, to open the passage-way between the steam-receptacle and the pressure-reducing pipes and to close the passage-way from the inclosure in which the steam-receptacle is placed into such steam-receptacle, the air or a portion thereof in the steam-receptacle will be withdrawn therefrom and the pressure in the steam-receptacle will be reduced below the pressure of the steam in the steam-supply pipe thereof, and (the resilience of the compound thermostatic expansion member of the thermostat device interposed between the steam-receptacle and the supply-pipe thereof being properly determined therefor) thereby the valve of the thermostat device will be drawn back from its seat, and steam will again enter the steam-receptacle from such steam-supply pipe, such steam, so soon as any shall have entered the receptacle, actuating the thermostat device to still further and more effectually open the passage-way from the steam-supply pipe into the radiator.

When the thermostat device illustrated as mounted adjacent to the steam-receptacle shown in Fig. 6 of the drawings or the one shown in Fig. 5 is used, the air passage-way extending into and (when the valve is open) through the valve is designed to be closed against the further admission of air into the steam-receptacle when the steam-receptacle or the contents thereof adjacent to such thermostat device are cooled a determined amount—that is, reduced to a given and determined temperature. In other words, the invention contemplates either an unlimited supply of air at atmospheric pressure to the steam-receptacle at times and the closing of the passage-way from the steam-supply pipe to the steam-receptacle or the supply of air at atmospheric pressure to the steam-receptacle until, if required, the steam-receptacle shall have become filled, or nearly so, with air, and the closing at such time of the air-supply passage-way to the steam-receptacle independently of the movement of the thermostat device controlling the operation of the valve which is interposed between the steam-receptacle and the pressure-reducing pipe.

I prefer to employ at all times the particular devices illustrated and hereinbefore referred to in connection with the parts with which they are respectively connected and operated, and I will proceed to describe them in detail, it being understood, however, that other thermostat devices and a different valve may be substituted for the ones shown and described without departing from that portion of the invention which has for its purpose the providing of a steam-receptacle, a supply of steam thereto at less than atmospheric pressure, and the alternate withdrawal of the contents of the steam-receptacle until the pressure of such contents (air or air and steam) is less than is the pressure of the steam supplied to the receptacle through the supply-pipes thereof, and the supply of air to such steam-receptacle at atmospheric pressure, thereby determining and controlling the quantity of steam contained in the steam-receptacle without specific reference to the devices employed for accomplishing the purpose sought.

The valve illustrated in Fig. 2 comprises shell or casing A', provided with the threaded projection B', by means of which the valve may be secured to a steam-receptacle, such threads fitting into corresponding threads in the wall of the steam-receptacle and the cap C' at the base of the valve, by means of which the pressure-reducing pipe N is secured thereto. Casing A' has therein chambers D' and e', passage-way F', connecting chambers D' and e', plug G' in passage-way F', passage-way H', air-inlet I', and passage-way J'. Plug G' has external screw-threads fitting into internal screw-threads in passage-way F', and has also a hole extending longitudinally therethrough to one side of the axial line thereof. Plug G' is thus made to seat down over hole F', and the air passing through the hole in the plug, and from thence through the passage-way F', is adjustably controlled. Passage-way H' extends from chamber D' to air-inlet I', and passage-way J' extends through the threaded projection B' to passage-way H', extending into such passage-way H' between chamber D' and air-inlet I', so that the valve M' will alternately open or connect passage-way J' with the chamber D' and the air-inlet I', there being, however, preferably a point in the movement of the valve M' when passage-way J' is closed both to the chamber D' and to air-inlet I'. There is contained within the chamber D' the expansible member K', attached at one end thereof to the adjustable abutment L', which abutment is adjusted so that expansion of the expansible member K' by the presence of steam in the chamber D' will force the end of such expansible member which is adjacent to the passage-way H' into position to close such passage-way.

$l'$ $l'$ are passage-ways through adjustable abutment L', by means of which chamber D' is in communication with reduced-pressure pipe N.

In passage-way H', I place the longitudinally-movable valve M', hereinbefore referred to, such valve having the spider ends $m'$ $m'$, the outer one of such spider ends extending through the shell or casing A' and secured to the fulcrumed lever N'.

O' is a diaphragm secured in shell or casing A', as by screw-threaded ring E', fitting into corresponding screw-threads in the shell or casing, the upper side of the diaphragm being subjected to atmospheric pressure. The chamber $e'$, hereinbefore referred to, is obtained by means of this diaphragm O'.

P' is a disk having post $p'$ thereon, to which post the fulcrumed lever N' is attached. Movement of the diaphragm O' thus produces corresponding movement of the lever N'.

Q' is a spring in chamber $e'$, one end whereof abuts against the wall of the chamber and the other end whereof abuts against diaphragm O' or against the interposed disk $q'$.

Plug G' in passage-way F' is adjusted to permit a determined quantity of air to pass from chamber $e'$ into chamber D' when such determined quantity or a greater quantity is supplied to such chamber $e'$, and when the quantity of air passing through the passage-way F' (by or around the adjusted plug G') is supplied to the chamber $e'$ through passage-way R the pressure in such chamber $e'$ is uniform or stationary. When a less quantity of air is supplied to chamber $e'$ through pipe R than is withdrawn therefrom through passage-way F' by the pressure-reducing pipe N, (chamber D' being at all times open to pressure-reducing pipe N through the passage-way $l'$,) the pressure in the chamber $e'$ becomes less than atmospheric pressure, and the atmospheric pressure on the upper surface or side of the diaphragm will then depress such diaphragm against the resiliency of spring Q', thus depressing the end of lever N', attached to post $p'$ of disk P', and moving valve M' to close the passage-way J' from discharging the contents of the steam-receptacle into chamber D', provided that such passage-way is open into such chamber before the occurring of such movement of the valve M'. When the diaphragm O' is being depressed or forced in by atmospheric pressure, as last above described, the thermostat device Q, about to be described, is actuated to open the passage-way $q$ therefrom to pipe R, so that more air can pass through such pipe R to the chamber $e'$ than is withdrawn from the chamber by the pressure-reducing pipe N through passage-way F', atmospheric pressure will again obtain in such chamber $e'$ and the spring Q' will force diaphragm O' outward, moving lever N' and valve M' to close passage-way J' to air-inlet I', and when such outward movement of the diaphragm is sufficiently great to open such passage-way J' to chamber D', thereby reëstablishing communication between the steam-receptacle and the pressure-reducing pipe, (providing the expansible member K' has contracted sufficiently because of the absence of steam in chamber D' to open passage-way H' to chamber D',) and the pressure in the steam-receptacle will again be reduced below the pressure of the steam-supply and steam will again enter the steam-receptacle. When the diaphragm O' is forced inward by atmospheric pressure, as above described, to open communication between air-inlet I' and the steam-receptacle to which the valve is attached, air will enter through such inlet, passage-way H', and passage-way J' into the steam-receptacle and will force the steam contained therein therefrom, except so much thereof as is reduced to water of condensation thereby, such steam being replaced by the air so entering the steam-receptacle.

The thermostat device Q (shown in vertical section in Fig. 3 of the drawings) comprises the cylindrical casing $A^2$, having apertures $B^2$ $B^2$ therein, the expansible member $C^2$, one end whereof is secured in the adjustable abutment $D^2$, and the arm $E^2$, by which a limited adjustment of the expansible member can be obtained. To indicate the amount of this adjustment in degrees or parts of a degree, the table $F^2$ is provided, having the marks $G^2$ thereon. The limited adjustment obtained by the arm $E^2$ is designed to be used by the occupant of the inclosure heated by the steam-receptacle or by the person in charge thereof, the abutment $D^2$ being adjusted so that when the expansible member $C^2$ is at the temperature thereof which exists when the inclosure is at the desired temperature the passage-way $q$ will be so closed or so nearly closed that the quantity of air admitted through such passage-way $q$ and from thence through the pipe R into chamber $e^2$ will substantially equal the quantity of air withdrawn from such chamber $e^2$ by pressure-reducing pipe N through the passage-way F', around or by the stop G'. The passage-way $q$ is closed by the expansion of the expansible member $C^2$ when the temperature of the inclosure in which the thermostat device is placed is above the desired temperature and is opened by the contraction of such expansible member when the temperature of such inclosure is lower than is desired to be maintained. A fixed position is thus maintained to the diaphragm O' and valve M' when the temperature of the inclosure in which the thermostat device Q is placed is as desired, because at such time the quantity of air passing through the passage-way $q$ and pipe R is the same as the quantity of air passing from chamber $e^2$ into chamber D'. Steam is thus alternately forced out of and drawn into the steam-receptacle by variations in the temperature of the inclosure in which the thermostat is placed.

To prevent the passage of air from the steam-receptacle to the steam-supply pipes thereof, I provide the preferred one of the thermostat devices S S' $S^2$. Thermostat devices S S' $S^2$ comprise, respectively, an expansible member consisting of strips of metal $A^3$ and $B^3$ of different expansibility under a given change in temperature, such strips joined together in such a way that when the temperature adjacent thereto changes the valve $D^3$ thereof is moved to be seated or raised from its seat. When the temperature of the compound strip $A^3$ $B^3$ is raised, the valve $D^3$ is raised from its seat, and when the temperature thereof is lowered the valve is seated.

$E^3$ is an air passage-way extending from thermostat devices S S', respectively, to air-inlet I' of the valve P. When either of these thermostat devices is used, the supply of air to the valve P is cut off by the reduction of the temperature of the compound member, such reduction in temperature being effected in the case of thermostat device S by the reduction in temperature of the steam-receptacle adjacent thereto, and when the thermostat device S' is used such reduction in temperature of the compound expansible member is effected by the reduction in temperature of the contents of the steam-receptacle.

$s'$ is a casing to thermostat device S', into which casing pipe $F^3$ discharges air and from which the pipe $E^3$ obtains a supply of air when the valve $D^3$ is not seated, to be conveyed to the air-inlet I' of the valve P.

$S^2$ is the casing of thermostat device $S^2$. When thermostat device $S^2$ is used, the supply of air to air-inlet I' is not cut off at any time, but, on the contrary, when the pressure in the steam-receptacle is raised by the admission of air at atmospheric pressure to the same or a greater pressure than is the pressure of the steam supplied to such steam-receptacle, and at the same time the steam contained therein becomes cooled or driven out therefrom into the supply-pipe of such steam-receptacle, the compound member $A^3$ $B^3$ operates to close the valve $D^3$ thereof on its seat, thus stopping the admission of any air to the steam-supply pipes.

It is evident that the resiliency of the expansible member $A^3$ $B^3$ may be relied upon to open and close the passage-way from the steam-supply pipe into the steam-receptacle, as the pressure in such steam-receptacle alternately becomes less than and equal to the pressure of the steam in the supply-pipes; but to insure greater permanency in the position of the valve D³ when it is unseated I prefer to use the compound member described, such compound member when once the valve D³ is drawn from its seat by the pressure in the steam-receptacle being less than the pressure of the steam in the supply-pipe, acted upon by the steam then coming in contact therewith to maintain such valve off its seat until the pressure is greater in the steam-receptacle than in the steam-supply pipes or at least equal thereto, and the temperature obtaining in the steam-receptacle is less than when steam is contained therein.

As will be observed in the drawings, the reduced-pressure pipes N N or the valve P, which is interposed between the steam-receptacles and such reduced-pressure pipes, are attached to the steam-receptacles, so that the passage-way from the receptacle thereinto will be above the surface of the water of condensation which collects in the steam-receptacle, as it is not designed to return the water of condensation through such pipes N N. When the water of condensation is not to be returned through the steam-supply pipes, as in what is known as the "single-pipe" system, a special return-pipe is to be supplied, as pipe W. (Shown in Fig. 5.)

The steam-receptacle is preferably so constructed that when air passes thereinto through the air-inlet I' and passage-ways H' J', although the pressure of such air becomes equalized with the pressure of the steam therein (the discharge passage-way of the steam into the receptacle being many times the area in cross-section of the air-discharge passage-way) and remains equalized until in the construction illustrated in the receptacle shown in Fig. 6 the receptacle becomes completely filled with air, a part of such receptacle will have the steam contained in such part displaced by such air. The ordinary steam-radiator illustrated in the drawings meets these requirements named, as the several coils are connected at the base only, and hence air entering one coil—say the one to which valve P is attached or with which it communicates—may become filled with air the pressure whereof has become the same as the pressure of the steam which it displaces and the remaining coils may continue to be filled with steam. When so constructed, so much of the steam-receptacle as is filled with air will cease to radiate heat, while the remaining coils of such receptacle will continue to discharge heat. In this way the heating of the whole or any portion of the steam-receptacle is not so variable as to be termed "intermittent," as would be the case if the entire steam-receptacle were alternately heated and then cooled in the practical operation of the apparatus. It will be found in practice that at times one coil will be cool, at other times two, and again more, because of the fact that when an equilibrium of the thermostat device Q and valve P has been established but little variation of either thereof will occur.

In what is termed "indirect" heating—that is, where the radiator or steam-receptacle is placed in an air shaft or chamber from which the air heated by the steam-receptacle is to be discharged into an inclosure, as, say, a school-room, hall, or the like—the valve P may be located (as well the thermostat device Q) in the room or hall heated by such heated air. In such case the passage-way J' is extended through a sufficient length of pipe from the valve P to the steam-receptacle.

The passage-way F' in valve P, Fig. 2, is shown connecting chamber e' to chamber D', and such passage-way F' is for the purpose of establishing communication between chamber e' and the reduced-pressure pipe N.

Chamber D' is, in effect, an extension of reduced-pressure pipe N to passage-way H', expansible member K' being provided to close communication between such passage-way H' and the reduced-pressure pipe N when valve M' is in position opening passage-way J' to passage-way H' and steam is delivered from the steam-receptacle to expansible member K', (or to reduced-pressure pipe N.)

I am aware that in a steam-heating system there have been placed radiators, a pressure-producing apparatus, an exhaust device, and temperature-controlled mechanisms for establishing communication with either thereof and the respective radiators.

Having thus described the invention, what I claim as new, and desire to secure by Letters Patent, is—

1. In a steam heating apparatus, a radiator, an air-supply pipe and a reduced-pressure pipe, in combination with a valve apparatus consisting of a casing attachable to the radiator the air-supply pipe and the reduced-pressure pipe, and provided with passage-ways from the air-supply pipe and the reduced-pressure pipe to the radiator, and with a chamber having a passage-way thereinto and a restricted passage-way therefrom communicating with the reduced-pressure pipe, a movable wall to the chamber, means for forcing such movable wall outward when the pressure in the chamber approaches atmospheric pressure, a valve-plug arranged to close communication between both the air-supply and the reduced-pressure pipes to the radiator and to be moved from its closing position to establish communication between one of such pipes and the radiator, and a connection between the movable plug and the movable wall of the chamber; substantially as described.

2. In a steam heating apparatus, the combination of a radiator, a steam-supply pipe discharging thereinto, a reduced-pressure pipe, a valve apparatus interposed between the radiator and the reduced-pressure pipe, such valve apparatus provided with an air-inlet and passage-ways from the air-inlet and from the reduced-pressure pipe through the valve apparatus into the radiator, a valve in the valve apparatus seating to close such passage-ways and to move from such seating and alternately open one and the other of such passage-ways, such valve apparatus also provided with a chamber having an adjustably-restricted passage-way communicating with the passage-way from the reduced-pressure pipe into the radiator, a movable wall to the chamber, a connection between the movable wall and the valve, a thermostat device provided with a passage-way therefrom to the chamber, and an expansible member in the valve apparatus on the reduced-pressure-pipe side of the valve therein; substantially as described.

3. In a steam heating apparatus, the combination of a radiator, a steam-supply pipe discharging into the radiator, a reduced-pressure pipe, a valve apparatus interposed between the radiator and the reduced-pressure pipe, such valve apparatus provided with an air-inlet and passage-ways from the air-inlet and from the reduced-pressure pipe through the valve apparatus into the radiator, a valve in the valve apparatus seating to close such passage-ways and to move from such seating and alternately open one and the other of such passage-ways, such valve apparatus also provided with a chamber having a passage-way therefrom communicating with the passage-way from the reduced-pressure pipe into the radiator, means to restrict the passage-way from the chamber, a movable wall to the chamber, a connection between the movable wall and the valve and an expansible member placed on the reduced-pressure-pipe side of the valve and of the passage-way closed by its expansion, and a thermostat device not adjacent to the radiator and in the space or chamber the temperature whereof controls the action of the steam heating apparatus, such last-named thermostat device provided with a passage-way therefrom to the chamber provided with a movable wall in the valve apparatus; substantially as described.

4. In a steam heating apparatus, the combination of a radiator, a steam-supply pipe discharging into the radiator, a reduced-pressure pipe, a valve apparatus interposed between the radiator and the reduced-pressure pipe, such valve apparatus provided with a passage-way therethrough from the radiator to the reduced-pressure pipe and also provided with a chamber, and with an air-inlet, such chamber and such air-inlet, respectively, provided with passage-ways therefrom communicating with the passage-way through the valve apparatus from the radiator to the reduced-pressure pipe, and such valve apparatus comprising a movable wall in the chamber, means for restricting the passage-way from the chamber, a valve-plug seating to close the passage-way from the air-inlet and also the passage-way from the radiator to the reduced-pressure pipe and to be moved from such seating to alternately open such passage-ways, and an expansible member placed on the reduced-pressure-pipe side of the valve-plug and of the passage-way closed by the expansion thereof, with a thermostat device not adjacent to the radiator and in the space or chamber the temperature whereof controls the action of the steam heating apparatus, such thermostat device provided with a passage-way therefrom to the chamber in the valve apparatus, and an additional thermostat device adjacent to the radiator and actuated by the temperature thereof, such additional thermostat device provided with a passage-way therefrom to the air-inlet of the valve apparatus; substantially as described.

5. In a steam heating apparatus, the combination of a steam-radiator, a steam-supply pipe discharging thereinto, a reduced-pressure pipe, a valve apparatus interposed between the radiator and the reduced-pressure pipe, such valve apparatus provided with an air-inlet open to receive air at atmospheric pressure and provided with a chamber, and further provided with a passage-way from the radiator to the reduced-pressure pipe, a passage-way from the air-inlet communicating with the radiator, and a restricted passage-way from the chamber to the reduced-pressure pipe, and such valve apparatus comprising a valve-plug seating to close the passage-ways from the radiator to the air-inlet and from the radiator to the reduced-pressure pipe and movable from such seating to alternately open such passage-ways, a movable wall to the chamber, a connection between the movable wall and the valve-plug, an expansible member expanding by heat to close the passage-way from the radiator to the reduced-pressure pipe, on the reduced-pressure-pipe side of the valve-plug, a thermostat device, a conduit forming a passage-way from the thermostat device to the chamber in the valve apparatus, such thermostat device containing an expansible member expanding by heat to close the passage-way therefrom, and an additional thermostat device provided with a passage-way therefrom to the air-inlet of the valve apparatus, and having an expansible member closing, when expanded, such passage-way and so preventing the delivery of air to such air-inlet passage-way in the valve apparatus; substantially as described.

6. In a steam heating apparatus the combination of a radiator, a steam-supply pipe discharging into the radiator, a reduced-pressure pipe, a valve apparatus interposed between the reduced-pressure pipe and the radiator, such valve apparatus provided with communicating chambers having a restricted passage-way between them and one of such chambers provided with a passage-way communicating with the reduced-pressure pipe, such valve apparatus also provided with an air-inlet and passage-ways from the radiator to the air-inlet and to the chamber communicating with the reduced-pressure pipe, a movable wall to one of the chambers in the valve apparatus, a valve seating to close the passage-ways from the radiator, a connection between the valve and the movable wall, an expansible member in the chamber communicating with the reduced-pressure pipe arranged to close, when expanded, the passage-way from the radiator into such chamber, a thermostat device, an expansible member therein, a conduit forming a passage-way from the thermostat device to the chamber having the movable wall, and means for adjusting the expansible member in the thermostat device to restrict the passage-way therefrom to correspond at a given and determined temperature with the restriction of the passage-way between the chambers in the valve apparatus; substantially as described.

7. In a valve apparatus, a casing arranged to be attached to a steam-radiator and to a reduced-pressure pipe and provided with a passage-way therethrough from the reduced-pressure-pipe end to the radiator end thereof, with a chamber having a passage-way discharging thereinto and a restricted passage-way discharging therefrom to the reduced-pressure-pipe end of the casing and also with an air-inlet discharging into the radiator end of the casing, in combination with a valve-plug seating to close communication from both the air-inlet and the reduced-pressure-pipe end to the radiator end of the casing and movable from such seating to establish communication from one thereof to such radiator end, a movable wall to the chamber in the casing, means for forcing such movable wall outward when the pressure in the chamber approaches atmospheric pressure, and a connection between the valve-plug and the movable wall; substantially as described.

8. In a valve apparatus arranged at one end thereof to be attached to a steam-radiator and at the other end to be attached to a reduced-pressure pipe, and provided with chambers having a communicating restricted passage-way, one of such chambers provided with an additional passage-way thereinto and the other of such chambers provided with passage-way extending, respectively, to the reduced-pressure-pipe end and to the radiator end of the valve apparatus, and the valve apparatus also provided with an air-inlet and a passage-way therefrom to the radiator end of the valve apparatus, the combination of an expansible member expanding to close the passage-way from one of the chambers to the radiator end of the valve apparatus, a valve-plug seating to close such passage-way and the passage-way from the air-inlet, a movable wall to the other one of the chambers, means for forcing such movable wall outward when the pressure in the chamber approaches atmospheric pressure, and a connection between the valve-plug and the movable wall so that movement of the movable wall moves the movable plug from its seating to open one or the other of the passage-ways closed thereby; substantially as described.

CLARENCE E. VAN AUKEN.

In pressence of—
  CHARLES TURNER BROWN,
  FLORA L. BROWN.